United States Patent [19]

Kassai

[11] Patent Number: 4,649,596
[45] Date of Patent: Mar. 17, 1987

[54] CASTER

[75] Inventor: Kenzou Kassai, Osaka, Japan

[73] Assignee: Aprica Kassai Kabushikikaisha, Osaka, Japan

[21] Appl. No.: 630,218

[22] Filed: Jul. 12, 1984

[30] Foreign Application Priority Data

Jul. 21, 1983 [JP] Japan .................. 58-114225

[51] Int. Cl.⁴ .................................. B60B 33/00
[52] U.S. Cl. ............................... 16/35 R; 16/44
[58] Field of Search .................. 16/35 R, 35 D, 44;
188/69; 280/43, 43.17, 43.18, 43.19, 87.01,
87.02 W, 47.12, 204, 205

[56] References Cited

U.S. PATENT DOCUMENTS

| 1,633,638 | 6/1927 | Jarvis et al. | 16/35 R |
| 2,458,922 | 1/1949 | Andresen | 16/44 |
| 3,400,424 | 9/1968 | Altenweger | 16/35 R |
| 4,028,773 | 6/1977 | Morgan | 16/35 R |

Primary Examiner—Donald R. Schran
Assistant Examiner—James L. Wolfe
Attorney, Agent, or Firm—W. G. Fasse; D. H. Kane, Jr.

[57] ABSTRACT

In a caster the inherent caster swivelling function for allowing a wheel (28) to change its direction of travel can be stopped or locked. The change between the locked and the free swivelling condition is effected by turning an operating lever (15). The angular position of the operating lever (15) for causing the change is held in two stable conditions corresponding to the locked condition and to the free swivelling condition. For this purpose a lever block (22) selectively and resiliently abuts either against a first abutment surface or against a second abutment surface (24, 25) of the operating lever (15), whereby the operating lever (15) has two stable states in its rotating movement. The operating lever (15) is provided with a fitting projection (27) adapted to engage and disengage from the fitting recesses (26a, 26b) formed in a bushing attached to the fixed shaft (1). The engagement and disengagement is correspond to the aforesaid two stable states whereby, these states are retained in a stable manner.

5 Claims, 9 Drawing Figures

CASTER

BACKGROUND OF THE INVENTION

This invention relates to a caster and more particularly it relates to a caster whose inherent function of automatically changing the direction of the wheel can be selectively stopped.

Casters of this type are advantageous particularly when attached to a baby carriage, for example. That is, if such casters are attached to the lower ends of leg members, e.g., front legs, of a baby carriage, the baby carriage can be smoothly moved even if the pushing force thereon is weak. Further, it can be easily changed in the direction of travel even in narrow aisles as in stores. On the other hand, on a gravel load, for example, if the casters are in the state of being capable of changing the direction of the wheels on the basis of their inherent swivelling function, the casters allow the wheels to fluctuate more than is necessary; thus, the inherent function of the casters do more harm than good, making it rather hard to push the baby carriage. Thus, an improved caster should be so constructed that its inherent swivelling function can be stopped, as needed.

Such an improved caster is advantageous in that it ensures satisfactory steerability at all times depending upon the condition of the road.

SUMMARY OF THE INVENTION

Accordingly, an object of this invention is to provide, a caster of the described type with features for stopping its inherent function and for again removing such stopping by turning an operating lever, whereby the caster is capable of stably retaining the angular positions of said operating lever associated with the respective states of swivelling and non-swivelling.

According to the invention there is provided a caster comprising a fixed shaft secured to and vertically extending from an object to be moved by said caster, a rotary bracket supported for rotation around said fixed shaft, and a wheel supported for swivelling around said fixed vertical shaft on an axle extending horizontally at a position horizontally spaced from said fixed shaft, wherein said rotary bracket has a pair of vertically extending juxtaposed side walls. An operating lever and a lever bracket are installed between said side walls. The lever bracket supports said operating lever by a horizontally extending pin permitting the rotation of the operating lever. The lever bracket is provided with a lever block urged by a spring to move toward said pin. The portion of said operating lever adjacent to said pin has first and second adjoining abutment surfaces against which said lever block resiliently abuts, whereby the angular position of the operating lever is retained in first and second stable states. On the other hand, said fixed shaft has a fixed bushing attached thereto. The bushing has at least one fitting recess, while said operating lever is formed with a fitting projection capable of fitting in said fitting recess.

Therefore, the rotation of said rotary bracket around said fixed shaft brings the rotary bracket to a predetermined angular position, while when said first abutment surface abuts against said lever block with said operating lever assuming an angular position in its first stable state, said fitting projection fits in said fitting recess, whereby the rotation of said bracket around said fixed shaft is inhibited. That is, the inherent swivelling function of the caster is locked. On the other hand, when said second abutment surface abuts against said lever block with said operating lever assuming an angular position in its second stable state, said fitting projection escapes from said fitting recess, thus allowing said rotary bracket to rotate around said fixed shaft, whereby the caster can swivel again for enabling the wheel to change its direction of travel.

According to this invention, the lever block selectively and resiliently abuts against the first or second abutment surface of the operating lever. Thus, the operating lever has two stable states in its turning movement. The operating lever is provided with a fitting projection, which fits into or escapes from a fitting recess provided on the side associated with the fixed shaft. The fitting and escaping movements correspond to the aforesaid two stable states, and these states can be stably retained.

These objects and other objects, features, aspects and advantages of the present invention will becomes more apparent from the following detailed description of the present invention when taken in conjunction with the accompanying drawings.

BRIEF DESCRIPTION OF THE DRAWINGS

FIG. 8 shows the relation between a fixed bushing 8 and the operating lever 15 when a fitting projection 27 of the operating lever is fitted in a fitting recess 26a.

DESCRIPTION OF THE PREFERRED EMBODIMENTS

FIGS. 1 through 8 show an embodiment of this invention. In these figures, an object, such as a baby carriage, to which the caster of the invention is to be attached is omitted from the illustration. However, a vertically extending, fixed shaft 1 shown in some of the figures is fixed to such object. For this invention, a threading 2 at the upper end of the fixed shaft 1 is utilized, for example, for attaching the caster to the carriage.

Figure 1:
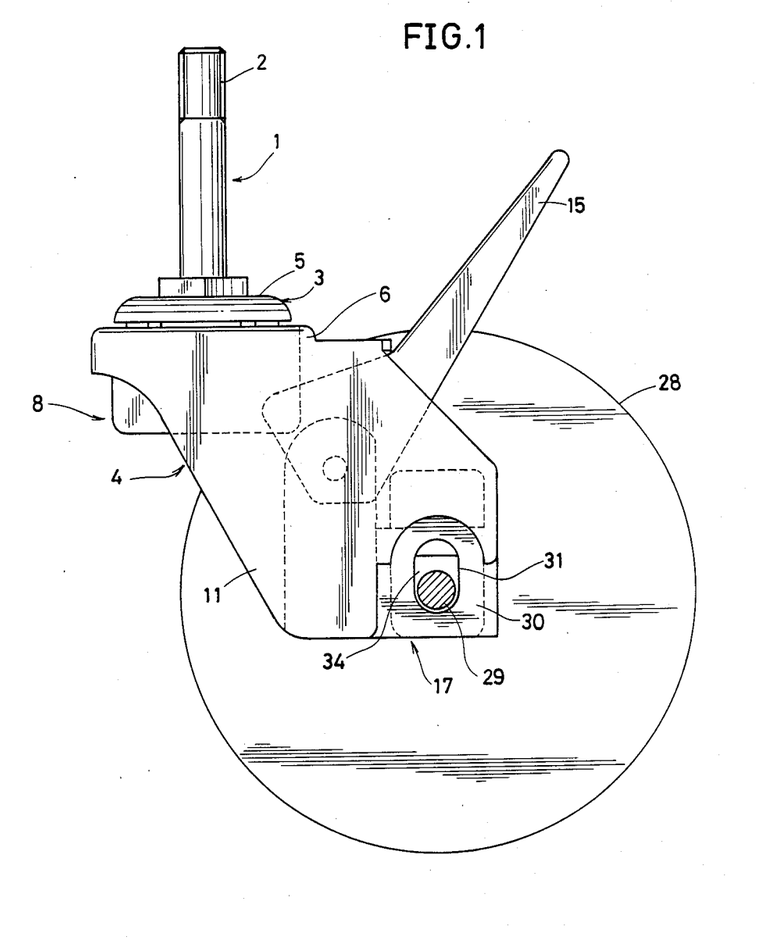
FIG. 1 is a front view showing the external appearance of the components of a caster according to an embodiment of this invention.
Figure 2:
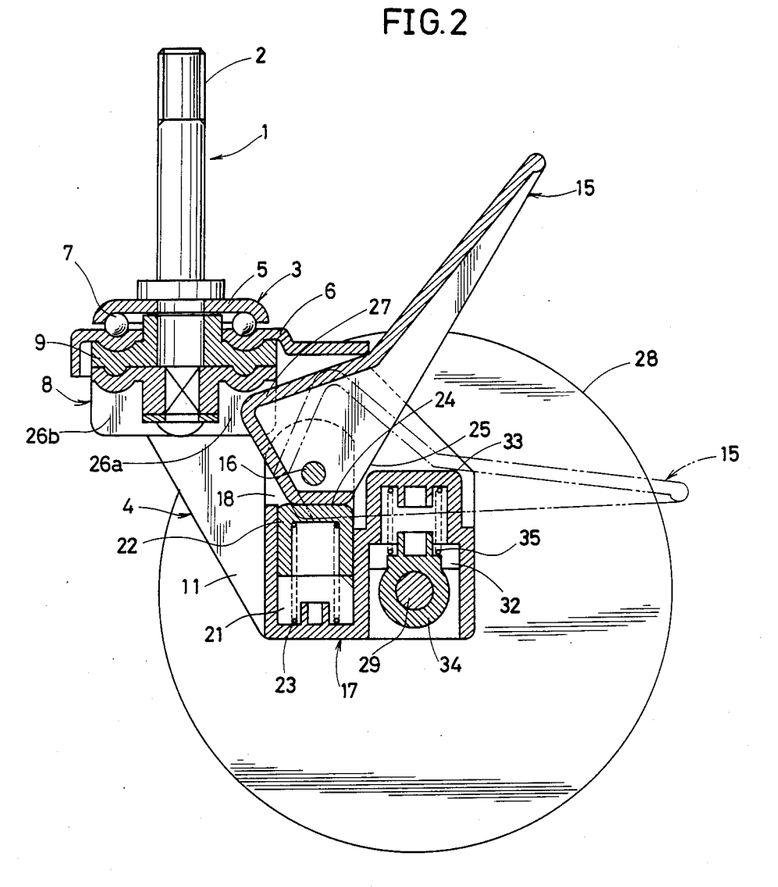
FIG. 2 is a view similar to FIG. 1, however showing a central vertical section, illustrating the internal construction of the caster.
Figure 3:
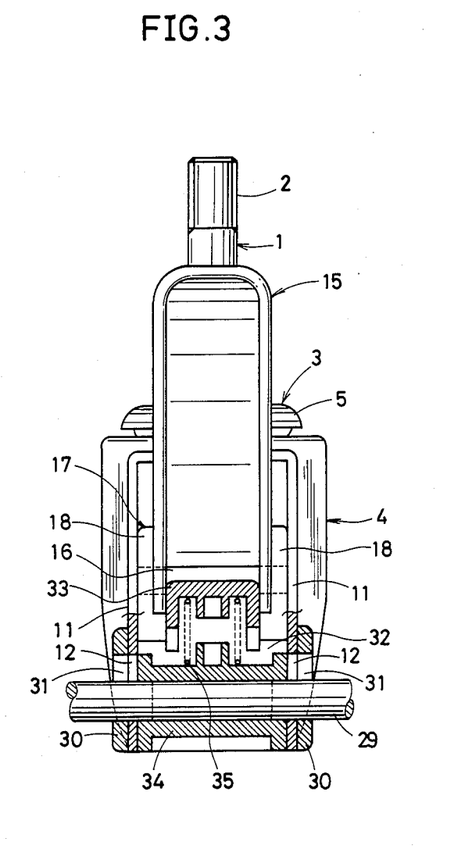
FIG. 3 is a right-hand side view, partly in section, of the caster.

Referring to FIGS. 1 to 3, the fixed shaft 1 has a thrust ball bearing 3 mounted thereon, whereby a bracket 4 is supported for rotation around the fixed shaft 1. The thrust ball bearing 3 comprises an upper dish 5 fixed to the fixed shaft 1, a lower dish 6 forming part of the rotary bracket 4, and steel balls 7 held between the upper and lower dishes 5 and 6. A fixed bushing 8 is secured to the lower end of the fixed shaft 1, and another bushing 9 is interposed between said fixed bushing 8 and the lower dish 6, reducing the friction between the lower dish 6 and the fixed bushing 8 produced by the rotation of the rotary bracket 4.

Figure 4:
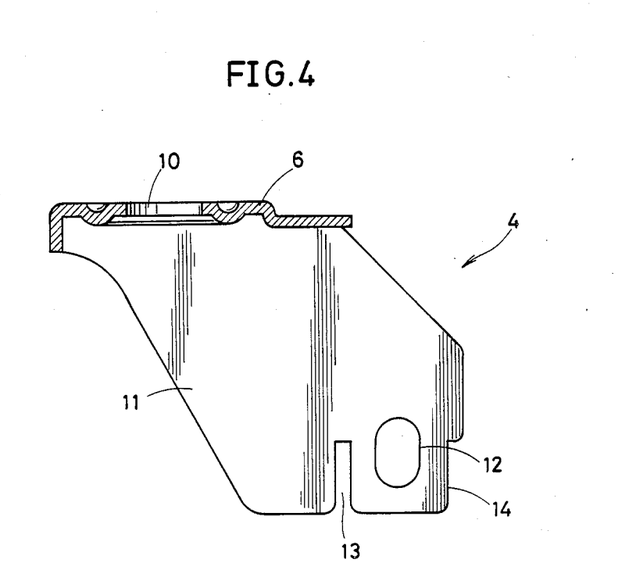
FIG. 4 is a front view, in central vertical section, of a rotary bracket 4.
Figure 5:
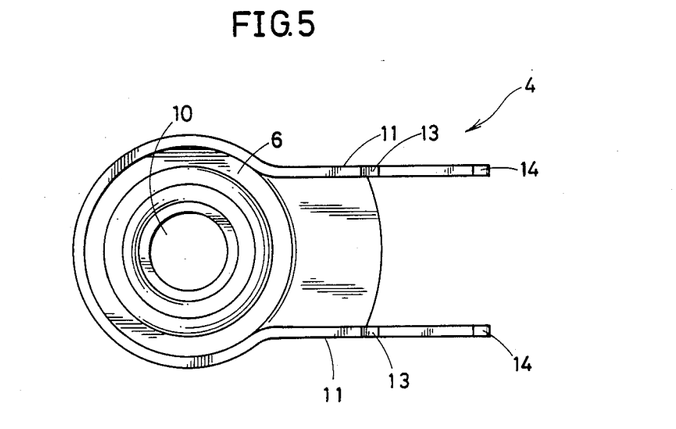
FIG. 5 is a bottom view of the bracket of FIG. 4.

The rotary bracket 4 is shown in FIGS. 4 and 5. The lower dish 6 of the rotary bracket 4 has a circular throughgoing hole 10 for insertion of the fixed shaft 1. The rotary bracket 4 also has a pair of vertically extending juxtaposed side walls 11. Each side wall 11 has a vertically extending elongated throughgoing hole 12 and notches 13 and 14 disposed on both sides of the region where the throughgoing hole 12 is formed.

Figure 6:
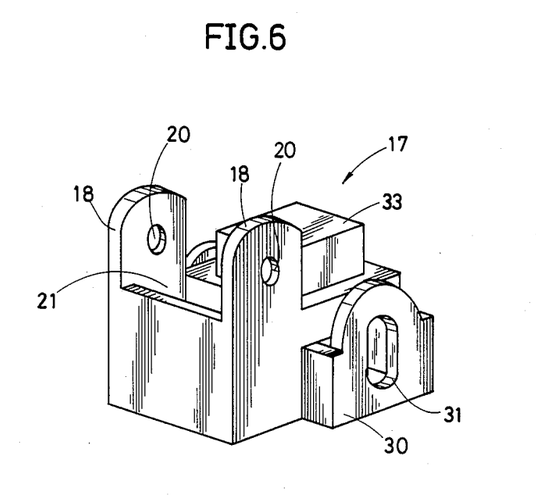
FIG. 6 is a perspective view of a lever bracket 17.
Figure 7:
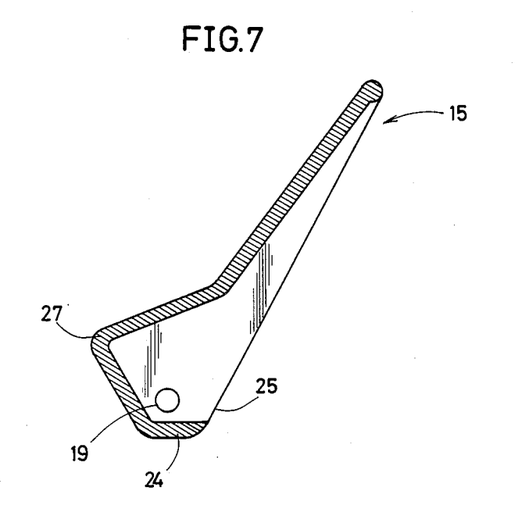
FIG. 7 is a front view, in central vertical section, of an operating lever 15.

Referring again to FIGS. 1 to 3, an operating lever 15 and a lever bracket 17 are installed between the side walls 11 of the rotary bracket 4. The lever bracket 17 rotatably supports said operating lever 15 by a horizontally extending journal pin 16. FIG. 6 shows, the lever bracket 17 in a perspective view and FIG. 7 shows, the operating lever 15 in a central vertical section.

The lever bracket 17 has a pair of upright walls 18, between which the operating lever 15 is disposed. The operating lever 15 has a pin receiving hole 19 for receiving the pin 16, the opposite ends of said pin 16 being received and held in pin attaching holes 20 formed in the upright walls 18 of the lever bracket 17.

The region between the upright walls 18 of the lever bracket 17 forms a space 21, where, as shown in FIG. 2, a lever block 22 is vertically and movably received. A compression spring 23 is disposed between the lever block 22 and the bottom of the space 21, whereby the lever block 22 is urged to move toward the pin 16.

On the other hand, the portion of the operating lever 15 adjacent to the pin 16 has first and second adjoining abutment surfaces 24 and 25 against which the lever block 22 can resiliently abut, whereby the angular position of the operating lever 15 is retained in two stable states. That is, as shown in solid lines in FIG. 2, the state in which the first abutment surface 24 of the operating lever 15 abuts against the lever block 22 is the first stable state, while as shown in phantom lines, the state in which the second abutment surface 15 abuts against the lever block 22 is the second stable state.

Figure 8:
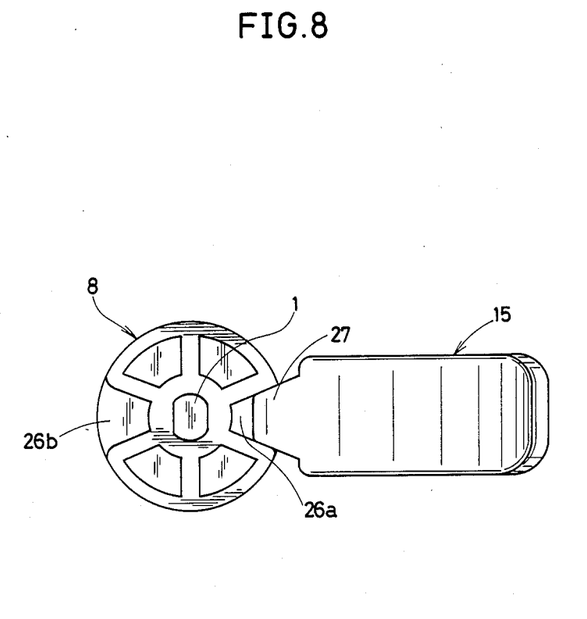

As best shown in FIG. 8, the fixed bushing 8 secured to said fixed shaft 1 has at least one fitting recess; however, in this embodiment two fitting recesses 26a and 26b are provided. On the other hand, the operating lever 15 has a fitting projection 27 capable of fitting in the fitting recesses 26a and 26b. When the first stable state of the operating lever 15 is established, the fitting projection 27 fits in either one of the fitting recesses 26a and 26b, while in the second stable state, it escapes from the fitting recess 26a (or 26b), as shown in phantom lines in FIG. 2. In addition, the first and second fitting recesses 26a and 26b are spaced 180 degrees apart from each other around the axis of the fixed shaft 1. Further, as best shown in FIG. 8, the lateral surfaces of the fitting projection 27 and of fitting recesses 26a and 26b are tapered where they contact each other.

FIGS. 1 and 2 show a wheel 28 which is supported rotatably with respect to the rotary bracket 4 on an axle 29 extending horizontally in a position horizontally spaced from the fixed shaft 1. In addition, as is clear from FIG. 3 showing the axle 29 extending beyond the two side walls 11 of the rotary bracket 4, two such wheels 28 may be disposed in parallel to each other on the axle 29 whereby one wheel is disposed on both sides of the rotary bracket 4.

The state in which the lever bracket 4 disposed between the side walls 11 of the rotary bracket 4, is attached to the rotary bracket 4, is as follows.

As shown in FIGS. 3 and 6, the lever bracket 17 has a pair of laterally extending fences 30. Each fence 30 receives the portion of the rotary bracket 4 surrounded by the notches 13 and 14, so that the lever bracket 17 is positioned with respect to the rotary bracket 4.

In this embodiment, it is so arranged that a cushioning action is exerted on the aforesaid wheel 28. The axle 29 extends through the aforesaid elongated throughgoing holes 12 of the rotary bracket 4 and also through vertically elongated throughgoing holes 31 in the fences 30 of the lever bracket 17. Therefore, the axle 29 is in the region in which it is vertically movable in these elongated throughgoing holes 12 and 31. The axle 29, with its sleeve 34, extends in a space 32 of the lever bracket 17 and a wall 33 defines the upper end of the space 32. The wall 33 projects upwardly so as to increase the height dimension of the space 32. A sleeve 34 is mounted on the axle 29, and a cushion spring 35 in the form of a compression spring is disposed between said sleeve 34 and the wall 33, whereby the axle 29 is constantly urged to move downwardly. Therefore, a cushioning action is exerted when the wheel 28 is moved upwardly with respect to the lever bracket 17 and the rotary bracket 4 against the resilience of the cushion spring 35.

The use and operation of the illustrated caster will now be described.

The state shown in FIGS. 1, 2 and 3 is the locked state in which the wheel 28 is prevented from changing its direction. The unlocked state is indicated by the position of the operating lever 15 shown in phantom lines in FIG. 2.

In the locked state, the operating lever 15 is in its relatively raised state, with the first abutment surface resiliently abutting against the lever block 22. Therefore, so long as there is no force greater than a predetermined value acting on the operating lever 15 to turn the latter, the operating lever 15 is maintained in its locked position corresponding to the first stable state. In this state, the fitting projection 27 on the operating lever 15 is fitted in the first recess 26a having a fixed position with respect to the fixed shaft 1. Therefore, the rotation of the rotary bracket 4 around the fixed shaft 1 is inhibited, so that the orientation of the wheel 28 is locked.

If the operating lever 15 is turned clockwise in FIG. 2 from the locked state into the unlocked state the lever moves downwardly, wereby the lever block 22 is also moved downwardly against the resilience of the compression spring and then upwardly, during which upward movement the state in which the second abutment surface 25 abuts against the lever block 22 is obtained. When the operating lever 15 assumes the second stable state, its fitting projection 27 escapes from the first fitting recess 26a. Therefore, the rotation of the rotary bracket 4 around the axis of the fixed shaft 1 is possible, enabling the wheel 28 to swivel and change its direction of travel. That is, the caster is now free for its inherent swivelling function.

In addition, in this embodiment, the two fitting recesses 26a and 26b are spaced 180 degrees apart from each other. As a result, there is another state in which the wheel 28 is locked against the change of direction. This state, not shown, is the locked state in which the fitting projection 27 on the operating lever 15 fits in the other fitting recess 26b.

This embodiment is applicable to a baby carriage, for example. In such baby carriage, the required direction of travel has usually been determined so that the person pushing the baby carriage faces in the travel direction. For this reason, it is desirable that when the wheel 28 is locked against the change of direction, the wheel 28 is pointing in this direction of travel. Therefore, in this embodiment, the casters are attached to the baby carriage in such a manner that the wheels can be locked only when they are pointing in the usual direction of travel of the baby carriage.

When the illustrated casters are attached to the baby carriage, the unlocked state shown in phantom lines in FIG. 2 is maintained when the baby carriage is moved on a relatively narrow sinuous road. In this case, depending upon the direction of travel of the baby carriage, the wheels 28 change the direction, ensuring satisfactory steerability. On the other hand, when the baby carriage comes to an extremely uneven road such as a gravel road, the locked state shown in solid lines in FIG. 2 is established, whereby the direction of the wheels 28 is fixed and the baby carriage can be satisfactory moved without causing the wheels 28 to fluctuate. In either of the aforesaid cases, cushioning actions are exerted on the wheels 28 to minimize any shock to a baby in the baby carriage.

In this embodiment, in cases where there is a relatively large difference in level in front of the travelling wheels 28, unlike the normal traveling condition described above, if the wheels 28 are subjected to a shock which causes the latter to change the direction suddenly, the unlocked state shown in phantom lines in FIG. 2, if established in such case, would allow the wheels 28 to change the direction, whereby such shock could be absorbed or at least cushioned. However, with the wheels 28 locked against the change of direction, such severe shock can damage the casters. In this embodiment, in order to avoid such damage, it is so arranged that when the wheels 28, even in the locked state, are subjected to a large force effective to change the direction of travel of the wheels, such locked state is automatically canceled.

FIG. 8 shows the relation between the fixed bushing 8 and the operating lever 15 and also shows the state in which the fitting projection 27 on the operating lever 15 is fitted in the fitting recess 26a. In this fitted state, the fitting projection 27 and fitting recess 26a are contacting each other along their tapered side surfaces. In this state, if the wheel 28 is subjected to a force which tends to change the direction of travel of the wheel 28, said force causes the operating lever 15 to turn around the axis of the fixed shaft 1. As a result, the fitting projection 27 is forced to escape from the fitting recess 26a as it is guided by the tapers formed on the side surfaces of the fitting projection 27 and fitting recess 26a. In response thereto, the operating lever 15 is turned around the axis of the pin 16, with the result that the fitting projection 27 completely escapes from the fitting recess 26a, enabling the wheel 28 to change the direction of travel. Therefore, such shock can be advantageously absorbed by the wheel 28 changing the direction of travel and hence damage to the caster can be avoided. In addition, the operation described above is also attained when the fitting projection 27 is fitted in the second fitting recess 26b.

This invention has been described with reference to the illustrated embodiment, but the embodiment may be suitably changed within the scope of the invention.

For example, only one of the fitting recesses 26a and 26b may be provided in the fixed bush 8.

Further, the arrangement for cushioning the wheel 28 is not essential.

Further, in the embodiment described above, the side surfaces of the fitting projection 27 and fitting recesses 26a and 26b along which they contact each other have been provided with a taper, but the degree of such taper may be made larger or smaller than the one shown in FIG. 8; the degree of such taper may be determined according to the magnitude of the shock with which it is desired to cancel the lock. Further, an embodiment without such taper also falls within the scope of the invention.

Figure 9:
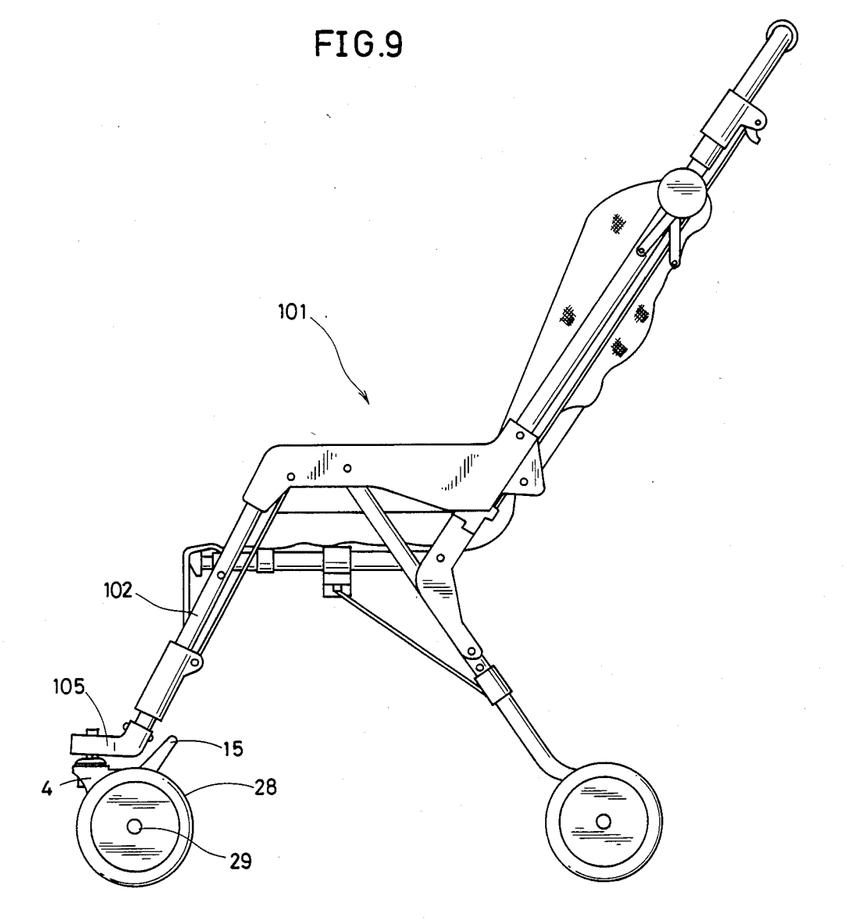
FIG. 9 is a side view of a baby carriage having casters described with reference to FIGS. 1 through 8.

Referring to FIG. 9, there is shown an example of a baby carriage 101 to which the embodiment shown in FIGS. 1 to 8 is advantageously applied. The main body of this baby carriage 101 is disclosed in U.S. Pat. No. 4,317,581 and British Pat. No. 2,061,195 which correspond to each other. The baby carriage 101 has front legs 102. A caster attaching member 105 is fixed to the lower end of the associated front leg 102. The aforesaid fixed shaft 1 (FIGS. 1 to 3) is fixed to the caster attaching member 015 so that it extends in a vertical direction.

While a baby carriage has been described as a typical example of an object to which the caster is to be attached, the invention is not limited to this example. Thus, the caster according to this invention may be applied to other movable articles which require casters or which become convenient if casters are attached thereto.

Although the present invention has been described and illustrated in detail, it is clearly understood that the same is by way of illustration and example only and is not to be taken by way of limitation, the scope of the present invention being limited only by the terms of the appended claims.

What is claimed is:

1. In a caster having a fixed shaft (1) adapted for vertically extending from an object (101) to be moved by said caster, a rotary bracket (4) supported for rotation around said fixed shaft (1), a wheel (28) supported by said rotary bracket (4) for swivelling around said fixed shaft (1), an axle (29) extending horizontally and located in a position horizontally spaced from said fixed shaft (1) for rotatably supporting said wheel (28) in said rotary bracket (4), the improvement comprising a pair of vertically extending juxtaposed side walls (11) forming part of said rotary bracket (4), a lever bracket (17) installed between said side walls (11) of said rotary bracket (4), an operating lever (15) including a horizontally extending journal pin (16) for rotatably supporting said operating lever (15) on said lever bracket (17), a first upwardly open recess in said lever bracket (17), a locking block (22) movably mounted in said upwardly open recess (21) of said lever bracket (17), a compression spring (23) located in said first recess for urging said locking block (22) toward said journal pin (16), means for retaining said operating lever (15) in first and second stable states comprising first and second adjoining abutment surfaces (24, 25) for cooperating with said locking block (22) against the force of said compression spring (23), a fixed bushing (8) rigidly attached to said fixed shaft (1), at least one fitting recess (26a) in said fixed bushing, said operating lever (15) having a fitting projection (27) fitting into said fitting recess (26a) for preventing a swivelling of said rotary bracket (4) around said fixed shaft (1) when said first abutment surface (24) of said operating lever (15) abuts against said locking block (22) for holding said operating lever (15) in a first angular position defining the first stable state, and whereby when said second abutment surface (25) of the operating lever (15) abuts against said locking block (22) said operating lever (15) assumes a second angular position defining the second stable state in which said fitting projection is disengaged from said fitting recess (26a), thus allowing said rotary bracket (4) to swivel around said fixed shaft (1), said lever bracket (17) comprising a second upwardly closed recess (32) extending substantially in parallel to said first upwardly open recess in said lever bracket (17), a cushion spring (35) in said upwardly closed recess (32) for biasing said axle (29) into a downward position, lateral longitudinal holes (12, 31) extending vertically through said side walls (11) and through said lever bracket (17), said axle (29) extending horizontally through said longitudinal holes under said biasing of said cushion spring (35), whereby vertically upward movements of said axle are damped by said cushion spring.

2. The caster of claim 1, wherein said fixed bushing (8) comprises two fitting recesses (26a, 26b) spaced 180 degrees apart from each other around the axis of said fixed shaft (1).

3. The caster of claim 2, wherein said recesses (26a, 26b) are so located in said fixed bushing (8) that said wheel (28) points in a normal direction of travel regardless in which one of said two fitting recesses (26a, 26b) said fitting projection (27) is engaged.

4. The caster of claim 3, wherein said object is a baby carriage (101).

5. The caster of claim 1, wherein side surfaces of said fitting projection (27) and of said fitting recesses (26a, 26b) along which said fitting projections (27) contact said recesses, are tapered.

* * * * *